US006826386B2

United States Patent
Doi

(10) Patent No.: US 6,826,386 B2
(45) Date of Patent: Nov. 30, 2004

(54) RADIO INFORMATION TERMINAL, RADIO COMMUNICATION SYSTEM, AND COMMUNICATING METHOD AND PROGRAM FOR USE IN THE RADIO INFORMATION TERMINAL

(75) Inventor: Yoshiharu Doi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 601 days.

(21) Appl. No.: 09/904,931

(22) Filed: Jul. 13, 2001

(65) Prior Publication Data

US 2002/0039886 A1 Apr. 4, 2002

(30) Foreign Application Priority Data

Jul. 14, 2000 (JP) ........................................ 2000-215098

(51) Int. Cl.$^7$ ................................................ H04B 7/14
(52) U.S. Cl. ........................ 455/25; 455/63.4; 455/504
(58) Field of Search ............................. 455/561, 562.1, 455/63.4, 25, 101, 504

(56) References Cited

U.S. PATENT DOCUMENTS

| | | | | |
|---|---|---|---|---|
| 5,966,095 A | * | 10/1999 | Hiramatsu et al. | 342/383 |
| 6,188,913 B1 | * | 2/2001 | Fukagawa et al. | 455/562.1 |
| 6,456,675 B2 | * | 9/2002 | Wagner et al. | 375/347 |
| 6,470,194 B1 | * | 10/2002 | Miya et al. | 455/562.1 |
| 6,553,018 B1 | * | 4/2003 | Ichihara | 370/342 |
| 6,717,932 B1 | * | 4/2004 | Blanc et al. | 370/342 |
| 2003/0013447 A1 | * | 1/2003 | Persson et al. | 455/437 |

FOREIGN PATENT DOCUMENTS

| | | |
|---|---|---|
| JP | 10-341200 | 12/1998 |
| JP | 2000-69541 | 3/2000 |

OTHER PUBLICATIONS

Takeo Ohgane, Spectral efficiency improvement by base station antenna pattern control for land mobile cellular systems, May 1993, pp. 55–60, Technical Report of the Institute of Electronics, Information and Communication Engineers with English Abstract.

\* cited by examiner

*Primary Examiner*—Nick Corsaro
*Assistant Examiner*—Tan Trinh

(57) ABSTRACT

The object of the present invention is to provide a radio communication system and a mobile station for the system that increase the number of mobile stations that can connect to the same frequency resource while maintaining communication quality.

In order to achieve the stated object, the mobile station is notified of unique word information, which is different for each mobile station, from a radio base station through the control channel, stores the information in a UW information storage unit, modulates a synchronization code which includes the information into a reference signal through a re-modulation signal, and stores the result in a memory. When transmission and reception are performed on a link channel, a weight calculation unit forms directivity in the direction of the radio base station using the reference signal. By performing directivity control in the mobile station, interference signals radiated to other wireless zones are reduced while interference signals from other wireless zones are eliminated, therefore the space between re-use of frequencies can be shortened, and the number of mobile stations that can be accommodated in the same frequency resource can be increased.

18 Claims, 11 Drawing Sheets

FIG. 4

| UNIQUE WORD | ALLOCATION STATE |
|---|---|
| 0011110101001100 | USER1 |
| 0110100000011001 | USER2 |
| 1001011111100110 | UNALLOCATED |
| 1100001010110011 | UNALLOCATED |

RADIO INFORMATION TERMINAL, RADIO COMMUNICATION SYSTEM, AND COMMUNICATING METHOD AND PROGRAM FOR USE IN THE RADIO INFORMATION TERMINAL

This application is based on application No. 2000-215098 filed in Japan, the content of which is hereby incorporated by reference.

BACKGROUND OF THE INVENTION (1) Field of the Invention

The present invention relates to a radio information terminal (hereinafter "mobile station") that connects to abase station, for example a telephone and a portable information communication device, and a radio communication system made up of the radio base station and the mobile station. In particular, the present invention relates to improved efficiency of frequency usage in the system.

(2) Description of the Related Art

Recently with the number of mobile stations, including portable telephones and portable communication devices, on the rise there is increasing demand in society for more effective use of frequency resources. Path division multiple access and the wireless zone system (the latter is also called the cellular system) are techniques which respond to this demand.

Path division multiple access is a system in which a radio base station uses a directional antenna to communicate with a plurality of mobile stations at the same time but in different directions using the same carrier wave frequency.

An example of a directional antenna that is used in the radio base station in path division multiple access is an adaptive array apparatus. The adaptive array apparatus is composed of a plurality of antenna devices which are provided fixed. The adaptive array apparatus forms a directivity pattern (also called "array antenna pattern") for reception and transmission for the antenna as a whole by movably varying the amplitude and phase of the reception and transmission signals for each antenna device.

The adaptive array apparatus, in forming the directivity pattern, not only increases transmission strength and reception sensitivity towards a desired mobile station, but also reduces transmission strength and reception sensitivity toward other mobile stations. Note that details of an adaptive array apparatus are contained in "Adaptive Signal Processing in Space Areas and its Applied Technology Special Feature" (Journal of the Institute of Electronics, Information and Communication Engineers Vol. J75-B-2 No. 11).

The wireless zone system is a system in which a service area is divided into sectors called zones and a frequency to be used for a carrier wave is allocated to each zone. Each radio base station and mobile station in the zone communicates using the allocated frequency of a carrier wave, and the same frequency is allocated repeatedly to zones which are in positions in which interference does not occur.

FIG. 10 is a schematic drawing for explaining path division multiple access and the wireless zones. 900 shows a service area, 901 shows one wireless zone, 902 shows the frequency allocated to the wireless zone, 903 shows a radio base station, 904 and 905 show mobile stations, 906 and 907 show radio base station directivity patterns in relation to the mobile stations 904 and 905 respectively, and 908 and 909 show the respective directivity patterns of the mobile stations 904 and 905.

Here the directivity patterns show, for communication within one wireless zone, a range in which transmission signals from the radio base station and the mobile station reach their destination with adequate strength, and a range in which the radio base station and the mobile station can receive signals with adequate sensitivity. These ranges are also understood to be ranges in which interference with communication in other wireless zones which use the same frequency occurs.

In the drawing the radio base station 903 communicates with the mobile stations 904 and 905 according to path division multiplexing using a carrier wave frequency f1 by forming different directivity patterns 906 and 907. The drawing shows schematically that the frequency f1 is allocated again to a wireless zone outside of the directivity patterns of the radio base station 903 and the mobile stations 904 and 905. Note that conventionally the mobile stations 904 and 905 transmit and receive signals with a uniform directionality in all directions.

In the path division multiple access system, the radio base station changes its directivity patterns following the movements of each mobile station using the adapter array apparatus, in order to avoid mixing of voices and to maintain communication quality. Control substance of the directivity pattern during reception and transmission according to minimum mean square error (MMSE) when there are N antenna devices is shown below.

The control of the directivity pattern during reception is for controlling extraction of a reception signal from a specific mobile station by suitably compositing signals received through each antenna device.

FIG. 11 is an outline showing control contents according to MMSE when a signal from the mobile station is received by the adaptive array apparatus.

$$y(t)=w(t-1)*x(t)=w1(t-1)*x1(t)+w2(t1)*x2(t)+ \ldots +wN(t-1)*xN(t) \qquad \text{<Equation 1>}$$

This control, as shown in the figure and in Equation 1, is performed to obtain a total sum y(t) by multiplying the reception signal vectors x1(t), x2(t), ..., xN(t) which are constituted from each signal actually obtained through the antenna devices, with the weight vectors w1(t−1), w2(t−1), ..., wN(t−1) which are constituted from each weight coefficient corresponding to each antenna. This control is for determining appropriate weight vectors so that y(t) includes a maximum of components of the reception signal from the mobile station from which the signal is being extracted, and so that y(t) includes a minimum of components of reception signals from other mobile stations.

Here, t shows the time that the signal reaches the radio base station and is, for example, a value showing an elapsed time within a timeslot in the PHS Standard and is used as a unit of time taken to receive 1 symbol. Therefore, the reception signal vector x, the weight vector w and so on are a signal series corresponding to values 1, 2, . . . . Furthermore, the weight vector w is a parameter for forming the directivity pattern, and the weight vector w and the reception signal vector x express as a complex vector a signal which has amplitude and phase.

The initial value of the weight vector is set appropriately, and the weight vector is updated each unit of time by being varied within a predetermined range in a manner explained below, so that the difference between a particular part of the signal (hereinafter "reference signal") sent from the mobile station d(t) and the signal y(t) is a minimum. The particular part is a part of the signal which is predetermined and fixed, for example, a preamble and a UW (unique word) which are symbol synchronization codes in the PHS Standard.

$$e(t)=d(t)-y(t)=d(t)-\Sigma(wi(t-1)*xi(t)) \qquad \text{<Equation 2>}$$

As shown in Equation 2, in each time t the difference e(t) between the signal y(t) calculated using the weight vector in time t−1 and the reference signal d(t). Wi(t) is calculated by correcting wi(t−1) so that the difference is a minimum. Theoretically, by repeating this calculation each time, the value of the weight vector converges at a constant value, and the signal y(t) becomes close to the signal of the mobile station from which the signal is being extracted.

The preamble and the unique word that are represented by the reference signal are sent before target data, which is the content of the communication, therefore the signal y(t) shows substantially the signal of the mobile station that is being extracted at the point of reception of the target data. Note that after conversation starts, the last weight vector value obtained in the previous time slot, for example, is used as the initial value in the following time slot.

Control of the directivity pattern in reception is a process of distributing a specific transmission signal in correspondence to each antenna device, multiplying a final weight vector corresponding to each antenna device obtained at reception with each distributed signal, and transmitting the obtained signals simultaneously from the antenna devices. According to this process, a transmission gain which is directional to the specific mobile station can be obtained, and the strength of transmission signals in directions of other mobile stations can be suppressed.

In this way, the radio base station extracts the signal from the specific mobile station, while adjusting the weight vector based on the signals received through the plurality of antennas and the information about the section of the preamble and the unique word whose signal content is already known. By using the weight vector to direct the directionality towards the specific mobile station during reception, communication is performed with each mobile station using path division multiple access avoiding interference to an extent and maintaining quality.

As explained above, in conventional radio communication systems, a plurality of mobile terminals are connected using one frequency carrier wave according to path division multiple access based on directional control in a radio base station. Furthermore, the same frequency can be reused by putting a set distance therebetween according to the wireless zone system. This allows for more effective usage of frequency resources.

However, a dramatic increase in the number of users of radio communication systems has put further pressure on frequency resources, even when the path division multiple access and wire less zone methods are used, leading to a demand to further increase the number of mobile stations that can be connected, while using fixed frequency resources.

SUMMARY OF THE INVENTION

The object of the present invention is to provide a radio communication system and a mobile station for the system that increase the number of mobile stations that can be connected using fixed frequency resources, while maintaining communication quality.

In order to achieve the stated objective, (1) a radio information terminal of the present invention is a radio information terminal which communicates with a radio base station, including a calculation unit for calculating data for controlling antenna directivity; and a reception unit for forming, using the calculated data, an antenna directivity in which reception gain of a signal transmitted from the radio base station increases, and receiving the signal using the formed directivity.

According to the stated construction, interference signals from other radio base stations can be eliminated because the radio information terminal forms reception directivity in the direction of the radio base station with which it is to communicate. The radio base station conventionally has the ability to eliminate signals being received from other radio information terminals and not to output interference signals to other radio in formation terminals. This is because the radio base station transmits and receives by performing directivity control in the direction of the radio information terminal with which it is to communicate. By working in cooperation the radio information terminal and the radio base station can shorten the distance between re-usage of frequency and improve frequency usage efficiency.

(2) The radio information terminal of (1) may further include an obtaining unit for obtaining a code for synchronization with symbols, the symbols being part of the signal, and the code being notified from the radio base station; and a storage unit for storing the obtained code, wherein the calculation unit calculates, based on the stored code, the data for controlling antenna directivity for each symbol.

According to the stated construction, the radio information terminal forms directivity based on the symbol synchronization code which is notified from the radio base station. By the radio base station which notifies each radio information terminal of a different symbol synchronization code and the radio information terminal working in cooperation, the radio information terminal reduces errors in synchronizing with signals for other terminals, can form directivity patterns accurately, and improves communication quality.

(3) In the radio information terminal of (2) the code may show one of (a) a preamble part of the signal, (b) a unique word part of the signal, and (c) the preamble part of the signal and the unique word part of the signal.

According to the stated construction the same effect as (2) is obtained.

(4) The radio information terminal of (2) may further include a generation unit for generating, by modulating the stored code, a reference signal which is a basis for forming the antenna directivity, wherein the data for controlling the antenna directivity is expressed as a weight coefficient in relation to each antenna signal, the calculation unit calculates a weight coefficient so that a difference between (a) a signal obtained by multiplying the signal received by each antenna with the weight coefficient and adding each resultant signal together, and (b) the reference signal decreases, and the reception unit forms the directivity by multiplying the signal received by each antenna with the weight coefficient and adding each resultant signal together.

According to the stated construction the same effect as (2) is obtained.

(5) The code in the radio information terminal of (4) may show one of (a) a preamble part of the signal, (b) a unique word part of the signal, and (c) the preamble part of the signal and the unique word part of the signal.

According to the stated construction the same effect as (4) is obtained.

(6) The radio information terminal of (4) may further include a transmission unit for forming antenna directivity so that transmission gain of a signal being transmitted towards the radio base station increases, by multiplying a transmission signal for each antenna with the weight coefficient and issuing a resultant signal.

According to the stated construction the radio information terminal can further shorten the space between reusage of frequencies and improve frequency usage efficiency, because it reduces the interference signal power radiated to radio base stations other than the one with which it is to communicate.

(7) The code in the radio information terminal of (6) may show one of (a) a preamble part of the signal, (b) a unique word part of the signal, and (c) the preamble part of the signal and the unique word part of the signal.

According to the stated construction the same effect as (6) is obtained.

(8) A radio communication system of the present invention includes a radio base station for allocating a different code to each radio information terminal, notifying each radio information terminal of the allocated code, incorporating the allocated code in information for the radio terminal, and transmitting the information to the radio terminal; and the radio information terminal of Claim 1.

According to the stated construction the same effect as (1) is obtained.

(9) A radio communication system of the present invention a radio base station for allocating a different code to each radio information terminal, notifying each radio information terminal of the allocated code, incorporating the allocated code in information for the radio terminal, and transmitting the information to the radio terminal; and the radio information terminal of Claim 2.

According to the stated construction the same effect as (2) is obtained.

(10) A radio communication system of the present invention a radio base station for allocating a different code to each radio information terminal, notifying each radio information terminal of the allocated code, incorporating the allocated code in information for the radio terminal, and transmitting the information to the radio terminal; and the radio information terminal of Claim 3.

According the stated construction the same effect as (3) is obtained.

(11) A radio communication system of the present invention a radio base station for allocating a different code to each radio information terminal, notifying each radio information terminal of the allocated code, incorporating the allocated code in information for the radio terminal, and transmitting the information to the radio terminal; and the radio information terminal of Claim 4.

According to the stated construction the same effect as (4) is obtained.

(12) A radio communication system of the present invention a radio base station for allocating a different code to each radio information terminal, notifying each radio information terminal of the allocated code, incorporating the allocated code in information for the radio terminal, and transmitting the information to the radio terminal; and the radio information terminal of Claim 5.

According to the stated construction the same effect as (5) is obtained.

(13) A radio communication system of the present invention a radio base station for allocating a different code to each radio information terminal, notifying each radio information terminal of the allocated code, incorporating the allocated code in information for the radio terminal, and transmitting the information to the radio terminal; and the radio information terminal of Claim 6.

According to the stated construction the same effect as (6) is obtained.

(14) The radio communication system of the present invention a radio base station for allocating a different code to each radio information terminal, notifying each radio information terminal of the allocated code, incorporating the allocated code in information for the radio terminal, and transmitting the information to the radio terminal; and the radio information terminal of Claim 7.

According to the stated construction the same effect as (7) is obtained.

(15) A radio communication method of the present invention is a communication method used by a radio information terminal which communicates with a radio base station, including a calculation step for calculating data for controlling antenna directivity; and a reception step for forming, using the calculated data, an antenna directivity in which reception gain of a signal transmitted from the radio base station increases, and receiving the signal using the formed directivity.

According to the stated construction the same effect as (1) is obtained.

(16) The communication method of (15) may further include an obtaining step for obtaining a code for synchronization with symbols, the symbols being part of the signal, and the code being notified from the radio base station; and a storage step for storing the obtained code, wherein the calculation step calculates, based on the stored code, the data for controlling antenna directivity for each symbol.

According to the stated construction the same effect as (2) is obtained.

(17) The communication method of (16) may further include a generation step for generating, by modulating the stored code, a reference signal which is a basis for forming the antenna directivity, wherein the data for controlling the antenna directivity is expressed as a weight coefficient in relation to each antenna signal, the calculation step calculates a weight coefficient so that a difference between (a) a signal obtained by multiplying the signal received by each antenna with the weight coefficient and adding each resultant signal together, and (b) the reference signal decreases, and the reception step forms the directivity by multiplying the signal received by each antenna with the weight coefficient and adding each resultant signal together.

According to the stated construction the same effect as (2) is obtained.

(18) The communication method of (17) may further include a transmission step for forming antenna directivity so that transmission gain of a signal being transmitted towards the radio base station increases, by multiplying a transmission signal for each antenna with the weight coefficient and issuing a resultant signal.

According to the stated construction the same effect as (6) is obtained.

(19) A program of the present invention is a computer executable program for realizing a communication method used by a radio information terminal which communicates with a radio base station, executing on a computer: a calculation step for calculating data for controlling antenna directivity; and a reception step for forming, using the calculated data, an antenna directivity in which reception gain of a signal transmitted from the radio base station increases, and receiving the signal using the formed directivity.

According to the stated construction the same effect as (1) is obtained.

(20) The program of (19) may further execute an obtaining step for obtaining a code for synchronization with symbols, the symbols being part of the signal, and the code being notified from the radio base station; and a storage step for storing the obtained code, wherein the calculation step calculates, based on the stored code, the data for controlling antenna directivity for each symbol.

According to the stated construction the same effect as (2) is obtained.

(21) The program of (20) may further execute a generation step for generating, by modulating the stored code, a reference signal which is a basis for forming the antenna directivity, wherein the data for controlling the antenna directivity is expressed as a weight coefficient in relation to each antenna signal, the calculation step calculates a weight coefficient so that a difference between (a) a signal obtained by multiplying the signal received by each antenna with the weight coefficient and adding each resultant signal together, and (b) the reference signal decreases, and the reception step forms the directivity by multiplying the signal received by each antenna with the weight coefficient and adding each resultant signal together.

According to the stated construction the same effect as (2) is obtained.

(22) The program of (21) may further execute a transmission step for forming.

directivity so that transmission gain of a signal being transmitted towards the radio base station increases, by multiplying a transmission signal for each antenna with the weight coefficient and issuing a resultant signal.

According to the stated construction the same effect as (6) is obtained.

BRIEF DESCRIPTION OF THE DRAWINGS

These and other objects, advantages and features of the invention will become apparent when taken in conjunction with the accompanying drawings which illustrate a specific embodiment of the invention.

In the drawings:

FIG. 3 is a block drawing showing the structure of the user processing unit 51a;

FIG. 4 shows an example of the data structure and content of unique word information;

DESCRIPTION OF THE PREFFERED EMBODIMENT

<Radio Base Station>

The radio base station in an embodiment of the present invention path division multiplexes a maximum of four signals on the same frequency according to path division multiple access, in addition to TDMA/TDD (Time Division Multiple Access/Time Division Duplex) determined by the PHS Standard, and connects wirelessly to mobile stations.

<Overall Structure>

Figure 1:
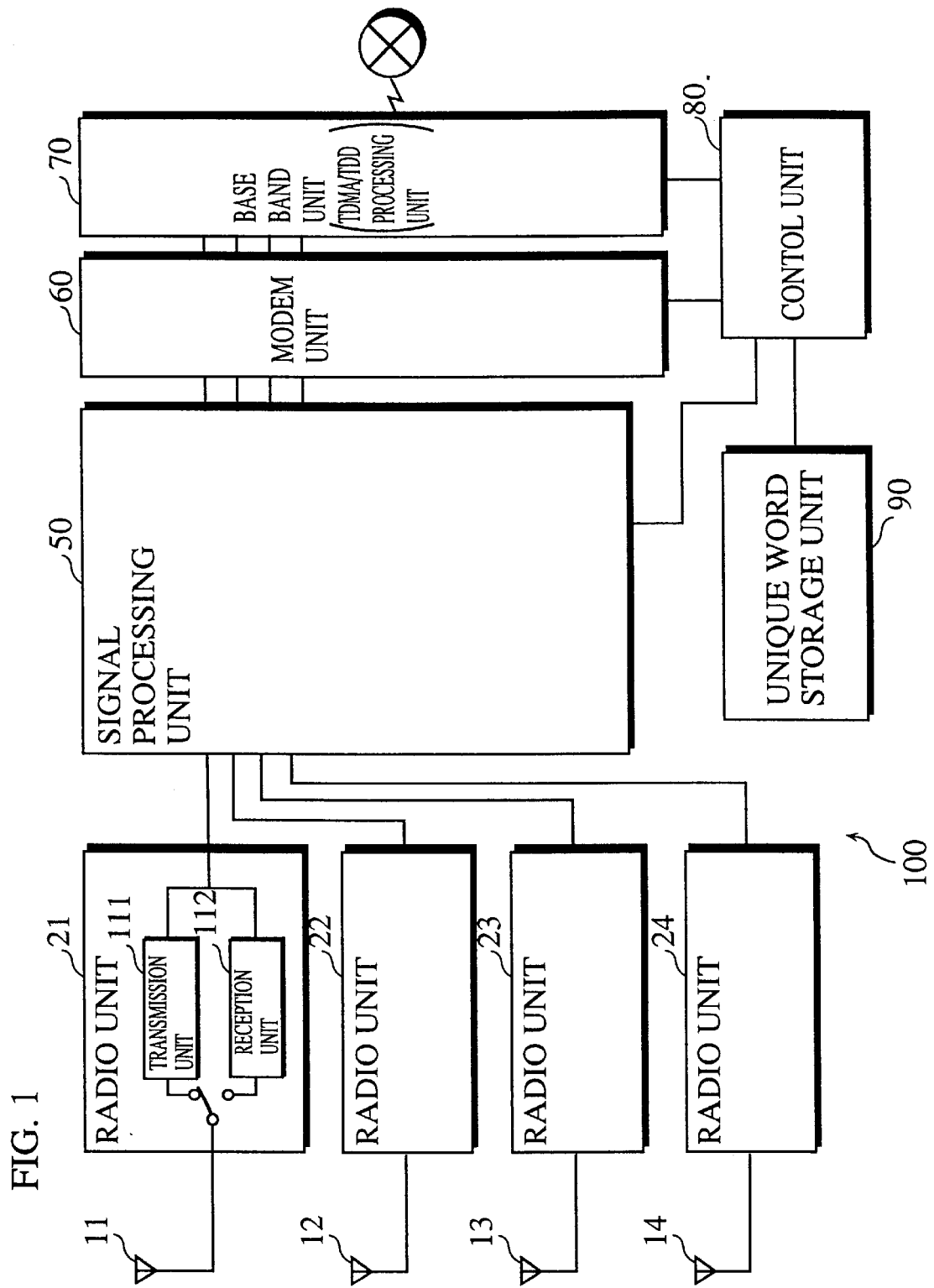
FIG. 1 is a block drawing showing the structure of a radio base station.

FIG. 1 is a block diagram of the structure of a radio base station 100 in an embodiment of the present invention.

The radio base station 100 is composed of antennas 11 to 14, radio units 21 to 24, a signal processing unit 50, a modem unit 60, a base band unit 70, a control unit 80, and a unique word storage unit 90.

The radio base station 100 multiplexes four channels in one TDMA/TDD frame and simultaneously processes a maximum of four telephone line signals to be path division multiplexed on one channel. One TDMA/TDD frame has a 5 ms time cycle, and is composed of four transmission time slots and four reception time slots, which are obtained by dividing each time cycle equally into eight. Each of the transmission and reception time slots are composed of one time division multiplex channel.

The base band unit 70 transfers signals (voice or data base band signals) between a plurality of lines connected through a telephone exchange network, and the signal processing unit 50.

The modem unit 60 performs modulation and demodulation of digitized base signals between the signal processing unit 50 and the base band unit 70 according to $\pi/4$ shift QPSK (Quadrature Phase Shift Keying). This modulation and demodulation is performed simultaneously in one division channel for a maximum of four TDMA/TDD frames that are path division multiplexed.

The signal processing unit 50, under the control of the control unit 80, performs control regarding forming of the directivity pattern. In other words, the signal processing unit 50 extracts path division multiplexed reception signals that have been input from each radio unit 21 to 24, from each mobile station, and outputs the extracted signals to the modem unit 60. In addition, the signal processing unit 50 generates path division multiplex signals so that transmission signals input from the modem unit 60 can be transmitted to the desired mobile station, and controls output of the generated signals to the radio units 21 to 24. Specifically, this is achieved by a programmable DSP (Digital Signal Processor).

The control is performed by MMSE; specifically in the following way for each time slot in a maximum of 4 TDAM/TDD frames which are processed simultaneously in the modem unit 60. On receiving a signal, the weight vector is adjusted so that the difference between the reference signal and the sum total of the signal being received by each radio unit 21 to 24 which is multiplied by the weight vector corresponding to the signal received by each radio unit is as small as possible. Furthermore, during transmission, a signal which is the transmission signal multiplied by the weight vector found at the directly preceding reception is distributed to each radio unit 21 to 24.

Note that in path division multiple access the directivity pattern is formed and transmission and reception are performed only on the communication channel (T channel). As for communication on other control channels, control processing is performed with the radio station in a conventional manner, without pass division multiple access. However, the reference signal used is different for each mobile station. This will be explained later on.

Each of the radio units 21 to 24 have the same structure. The radio unit 21 is composed of a transmission unit 111 which includes a high power amp, and a reception unit 112 which includes a low noise amp.

The transmission unit 111 converts input low frequency signals to high frequency signals, amplifies the signals to a transmission output level and outputs the signals to the antenna 11. The transmission unit 111 has the function of adjusting transmission signals by controlling the high power amp gain in response to instructions from the control unit 80.

The reception unit 112 has the function of converting high frequency signals received by the antenna 11 to low frequency signals, amplifying and outputting the signals to the signal processing unit 50.

The control unit 80 is specifically composed of a CPU (Central Processing Unit), a memory, and so on, and has the function of controlling each unit in the radio base station 100 with a program in the memory that the CPU executes.

The unique word storage unit 90 includes unique words for allotting to a plurality of mobile stations that are path division multiplexed. The unique word storage unit 90 retains unique word information which shows each unique word and the relationship with the corresponding mobile station. Note that the unique word information will be explained in detail later.

Figure 2:
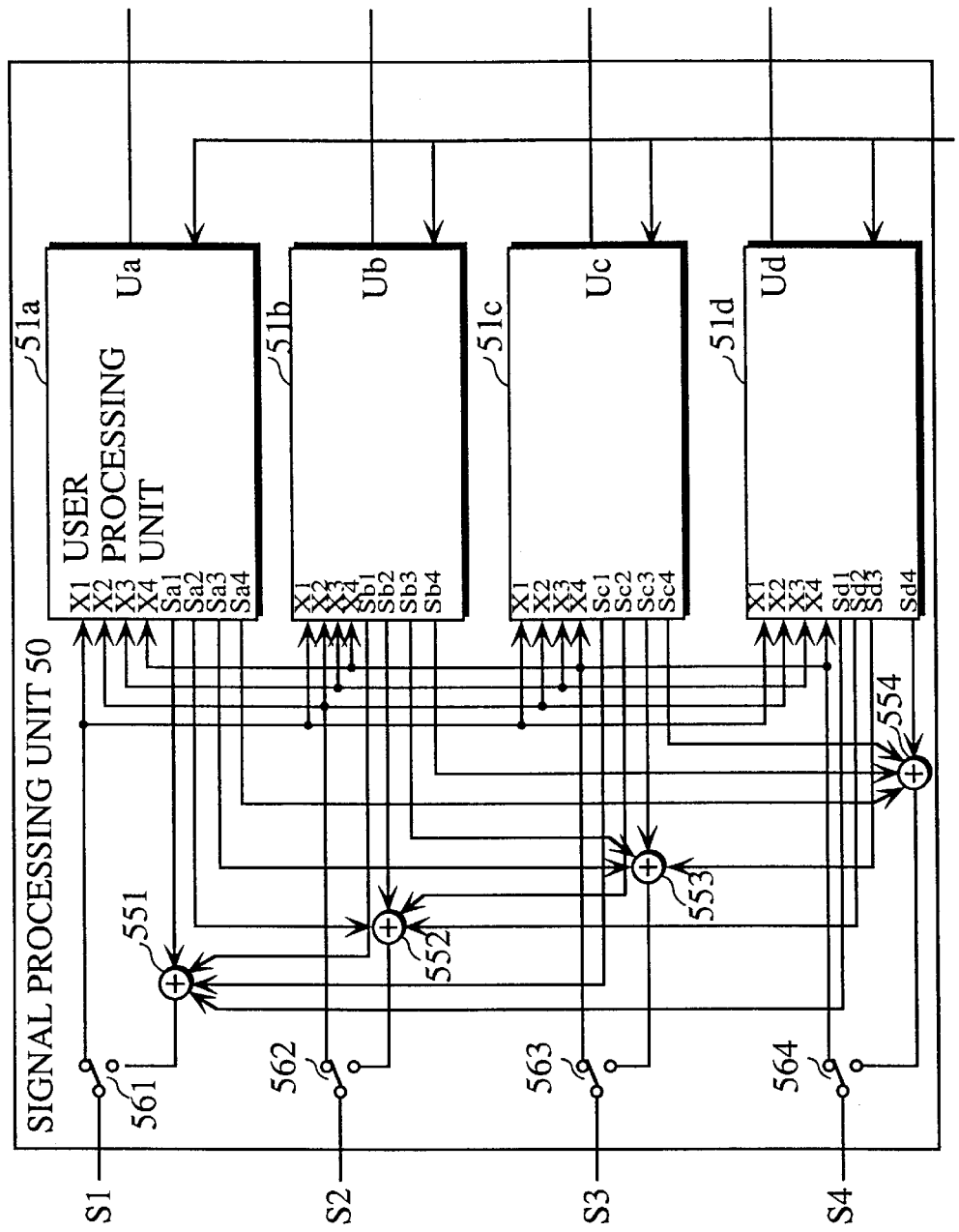
FIG. 2 is a block drawing showing the structure of the signal processing unit 50.

FIG. 2 is a bock drawing of the structure of the signal processing unit 50.

The signal processing unit 50 is composed of reception/transmission switches 561 to 564, adding devices 551 to 554, and user processing units 51a to 51d.

Each of the user processing units 51a to 51d adjusts the weight vector so that a signal of one mobile station communicating in a time slot, for each time slot in one TDMA/TDD frame, can be transmitted and received optimally. The processing units 51a to 51d receive input signals X1 to X4 respectively from the radio units, and output output signals Sa 1 to Sa 4 to each radio unit respectively. Namely, each user processing unit 51a to 54a extracts a signal from one of the mobile stations that are being path division multiplexed, and conveys the signal to the modem unit 60. Furthermore, each user processing unit 51a to 54a adjusts the transmission signal conveyed from the modem unit 60 for each antenna in relation to the particular mobile station, and outputs the transmission signal to one of the radio units.

The transmission/reception switches 561 to 564 switch in response to transmission and reception according to control by the control unit 80.

The adding devices 551 to 554 calculate the output signal to each radio unit, which has been adjusted for each mobile station by the user processing units 51a to 51d, and output the calculated output signals to the radio units 21 to 24.

Figure 3:
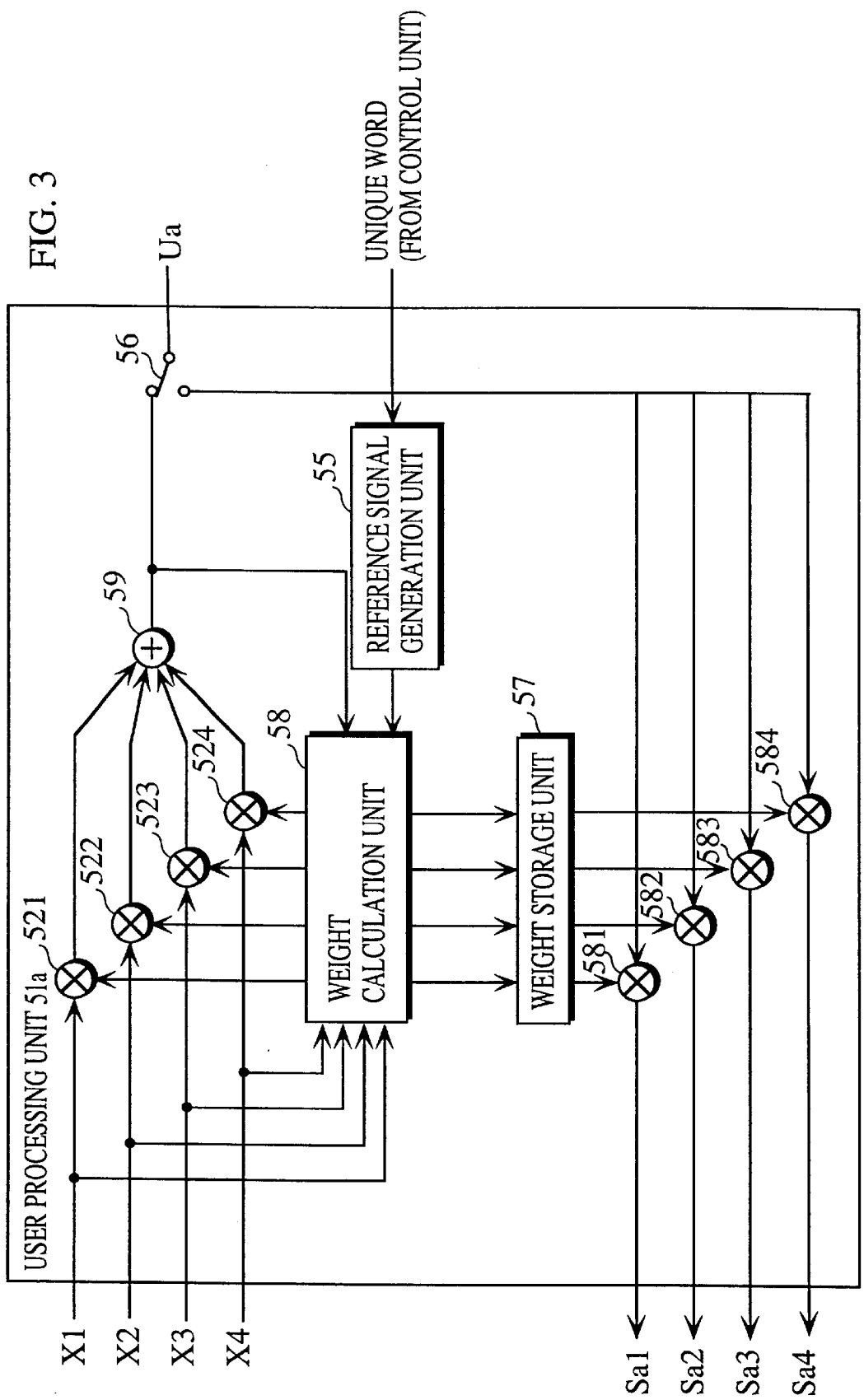

FIG. 3 is a block diagram showing the structure of the user processing unit 51a.

The user processing unit 51a is composed of multiplying devices 521 to 524 and 581 to 584, an adding device 59, a transmission/reception switch 56, a reference signal generation unit 55, a weight calculation unit 58, and a weight storage unit 57.

Here, the reference signal generation unit 55 generates a reference signal showing a signal which the mobile station transmits about a unique word, and a start symbol (SS) and a preamble (PR) which are prescribed by the PHS Standard. The reference signal generation unit 55 generates the reference signal according to the value of the unique word received from the control unit 80. The control unit 80 gives a different unique word to each user processing unit, so the reference signal generated by the reference signal generation unit in regard to the unique word is different for each user processing unit.

The weight calculation unit 58 calculates the weight vector by the above-described MMSE. The weight calculation unit 58 treats each sum total of the each of reception signal vector X1, X2, X3, and X4 obtained from each of the radio units 21 to 24 multiplied respectively with the corresponding weight vector as a provisional reception signal, and adjusts the weight vector in the following way so that the difference between the provisional signal and the reference signal obtained by the reference signal generation unit 55 is a minimum.

Here, the reception signals X1 to X4 are expressed by a vector series x1(t), x2(t), x3(t), x4(t) which changes according to time. The respective corresponding weight vectors are expressed as w1(t), w2(t), w3(t), w4(t), and the provisional reception signal is expressed as y(t). The weight calculation unit finds the provisional reception signal according to the following Equation 3. t shows time as a unit of reception time of one symbol in a time slot in the PHS Standard.

$$y(t)=w1(t-1)*x1(t)+w2(t-1)*x2(t)+w3(t-1)*x3(t)+w4(t-1)*x4(t) \qquad \text{<Equation 3>}$$

After the provisional reception signal y(t) is found, it is adjusted by fluctuating the value of w(t−1) within a predetermined range so that the difference e(t) between the provisional reception signal y(t) and the reference signal d(t) is a minimum. This value is made to be the weight vector w(t). Note that e(t) is found through the following Equation 4.

$$e(t)=d(t)-y(t) \qquad \text{<Equation 4>}$$

The weight storage unit 57 stores the weight vector calculated by the weight calculation unit 58, and when transmitting multiplies the stored weight vector with each transmission signal received from the modem unit distributed among the antennas for one mobile station.

<Data Structure>

The following is an explanation of the unique word information retained by the unique word recording unit 90.

FIG. 4 shows the data structure and an example of the contents of the unique word information.

As shown in the figure, the unique word information shows a value of each unique word and information showing the state of allocation of the relevant unique word, in correspondence. There are four different types of values of unique words, each of which has a 16 bit value "0011110101001100" and so on. The state of allocation is a value such as "user 1" or "user 2" for specifying a mobile station, or a value to show that the unique word is not being used.

<Operations>

The following is an explanation of the operation of the radio base station having the above-described structure, centering on the control operations for allocating a unique word to each mobile station, which is a characteristic of the present invention.

Figure 5:
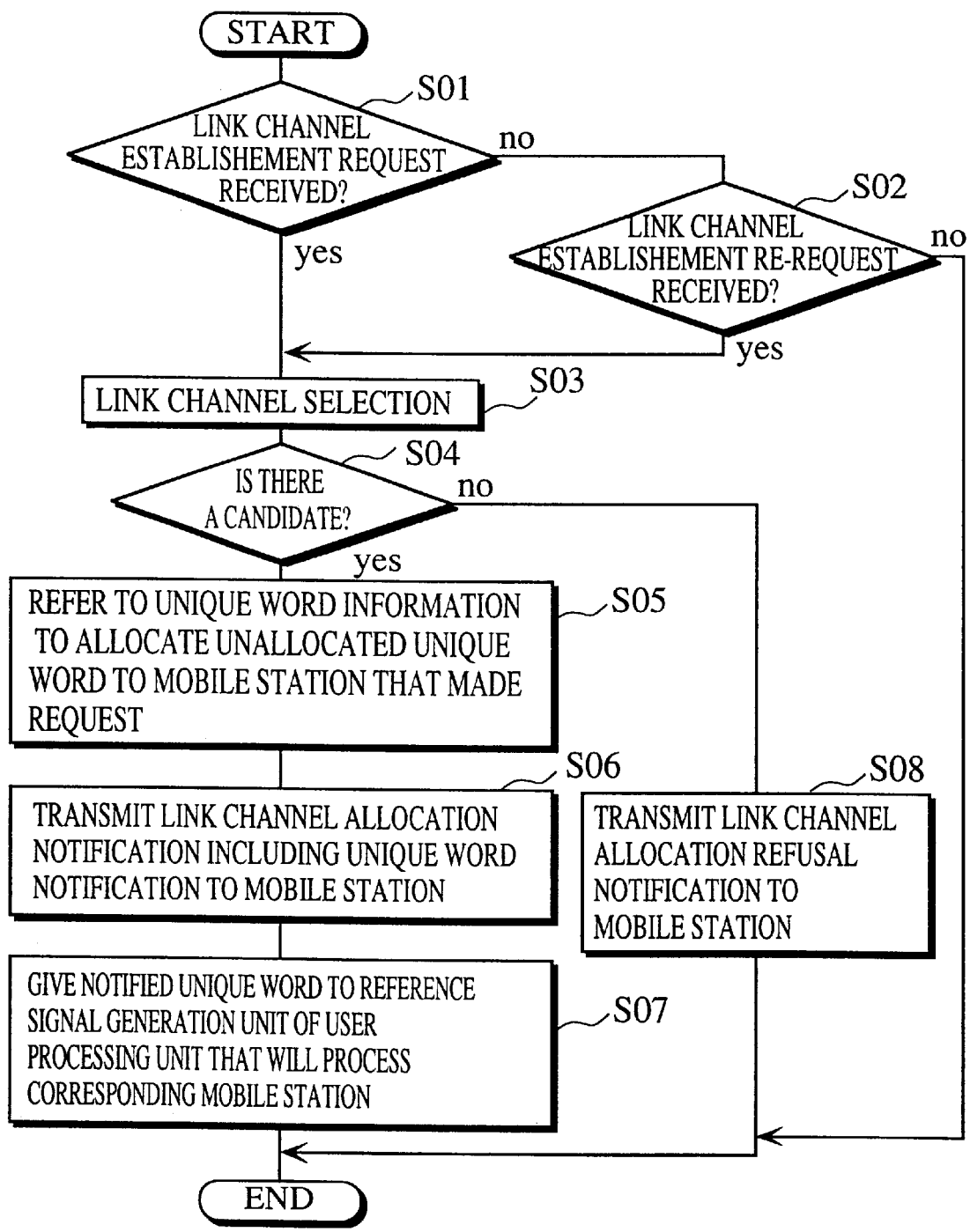
FIG. 5 is a flowchart of the operation of the radio base station 100 when receiving a link channel establishment request from a mobile station for starting conversation or data communication.

FIG. 5 is a flowchart showing the operations of the radio base station 100 when it receives a link channel establishment request from a mobile station for initiating conversation or data communication. Note that the operations are realized according to control by the control unit 80.

The control unit 80, when it receives a link channel establishment request (step S01), or a link channel establishment re-request (step S02), searches for a channel that can be allocated to the mobile station (step S03). If there is not such a channel (step S04) the control unit 80 controls so that link channel allocation refusal notification is sent to the mobile station (step S08).

When there is a channel that can be allocated (step S04), the control unit 80 refers to the unique word information retained in the unique word information storage unit 90, selects one unique word that is not yet allocated, and updates the unique word information so that the selected unique word and the mobile station are in correspondence (step S05). Then the control unit 80 controls so that link channel allocation notification which includes notification of the one selected unique word is transmitted to the mobile station (step S06).

As an example, the following explains a case when two mobile stations are communicating according to path division multiple access and a further link channel establishment request is received from a new mobile station. If the unique word information is such as the content example in FIG. 4, one unique word "1001011111100110", which is not already allocated, is selected and the unique word information is updated to show that the unique word is allocated to the new mobile station, according to the execution of step S05. Then, according to the execution of step S06, the unique word of the value "1001011111100110" is transmitted together with information specifying a channel which may be used, such as the frequency and the time slot, to the new mobile station.

After executing step S06, the control unit 80 gives the unique word that was notified to the mobile station to the reference signal generation unit of the user processing unit which will process the new mobile station (step S07). Thus the reference signal generation unit 55 of, for example, the user processing unit 51*c*, generates as a reference signal a signal which is expected to be sent from the mobile station, including the unique word. Furthermore, the user processing unit 51*c* includes the unique word in transmission data which it transmits to the mobile station.

Figure 6:
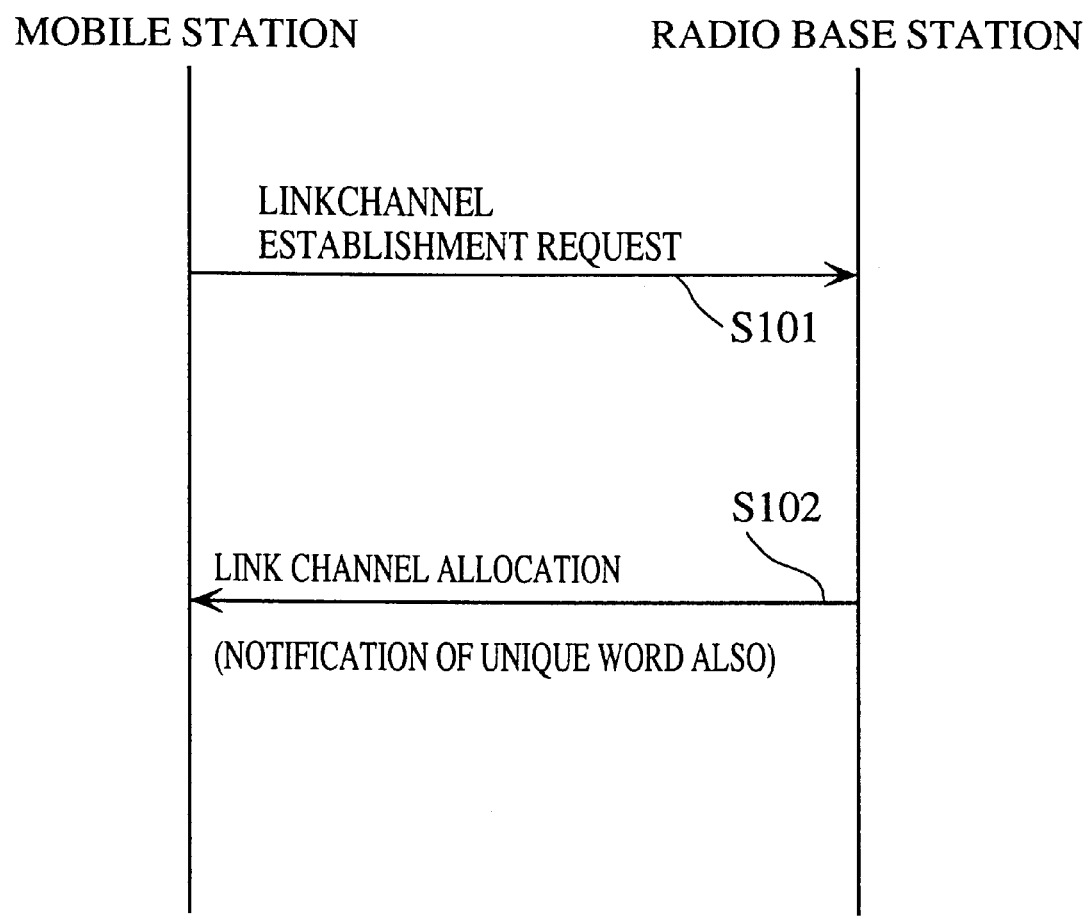
FIG. 6 is a timing chart showing an outline of the link channel establishment sequence between the mobile station and the wireless base station.

FIG. 6 shows an outline of the link channel establishment sequence between the mobile station and the radio base station.

As shown in the figure, when a link channel establishment request is received from the mobile station (S101), the radio base station performs the operation shown in FIG. 5, and notifies the mobile station of the link channel allocation which includes the unique word according to step S06 (S102). Subsequently, the radio base station includes the unique word in transmission data to the mobile station in communication on the allocated link channel.

Note that the mobile station uses the unique word value received in unique word value notification from the radio base station instead of the unique word in the PHS Standard in addition to a structure following conventional PHS Standard, as will be explained later. In addition, the mobile station also has a function of transmitting and receiving communication data with a radio base station which forms directivity using a reference signal which includes the particular unique key.

In this way, the radio base station 100 notifies the mobile station which attempts to initiate communication with the radio base station 100 of a unique word that is different to other mobile stations, and uses the unique word as a reference signal to extract a reception signal from the notified mobile station as well as including the unique word in transmission signals to the mobile station.

Thus, the radio base station 100 can communicate with the mobile station using path division multiple access, avoiding interference with other mobile stations and maintaining communication quality by working cooperatively with the mobile station.

<Mobile Station>

A mobile station in an embodiment of the present invention is a wireless information terminal that transmits and receives forming directivity in a direction of the radio base station with which it communicates. The mobile station communicates with the radio base station according to time division multiple access prescribed by the PHS Standard.

<Overall Construction>

Figure 7:
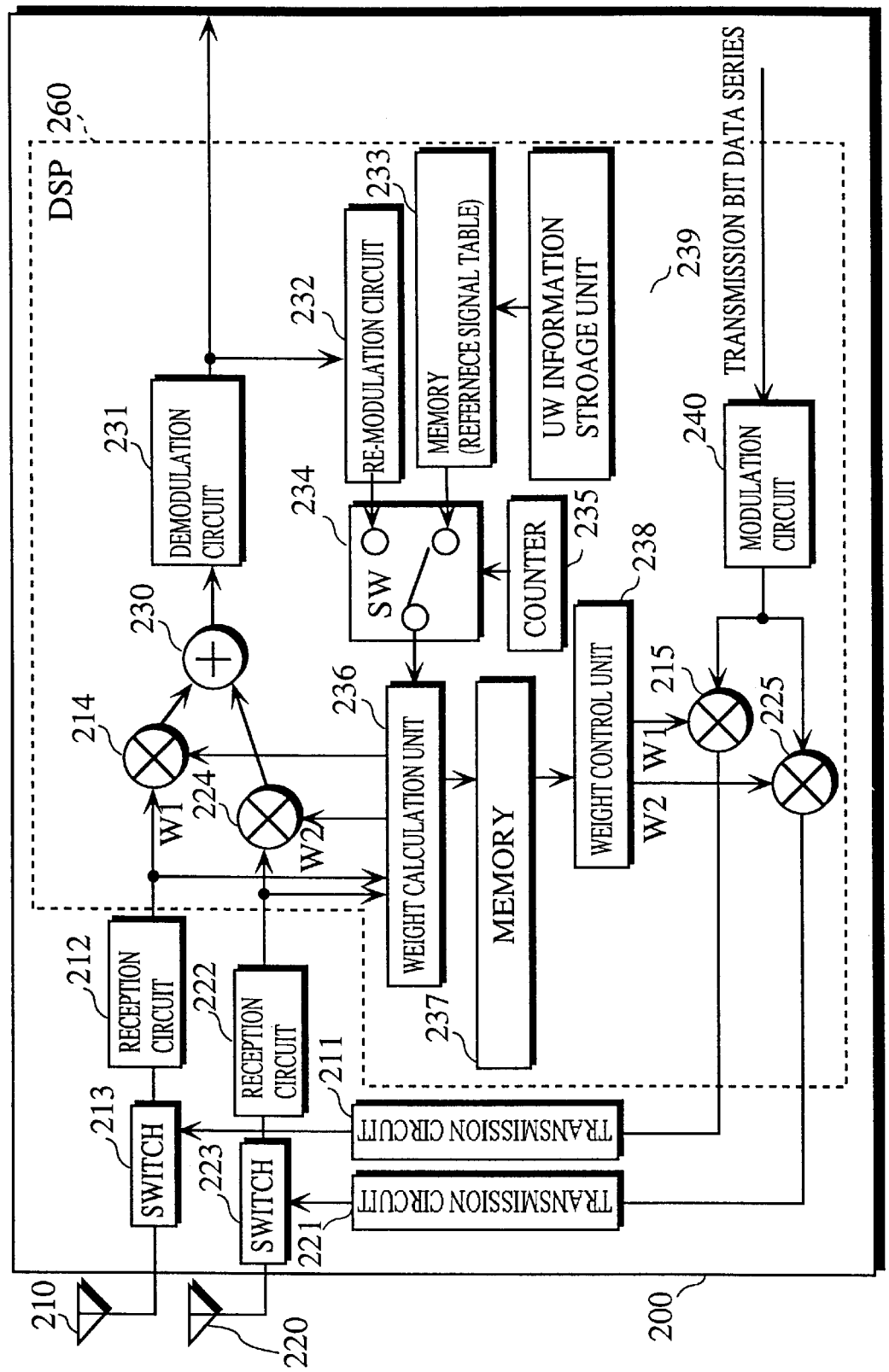
FIG. 7 is a block drawing of the structure of the main part of the mobile station.

FIG. 7 is a block drawing showing the structure of the main parts of a mobile station 200 in an embodiment of the present invention. As shown in the drawing, the mobile station 200 is composed of two radio units and a DSP (digital signal processor) 260 (framed by a broken line in the figure). One radio unit (hereinafter "radio unit A") is made up of an antenna 210, a switch 213, a transmission circuit 211, and a reception circuit 212, and the other radio unit (hereinafter "radio unit B") made up of an antenna 220, a switch 223, a transmission circuit 221, and a reception circuit 222. The mobile station 200 is an adaptive array apparatus which transmits and receives by forming an array antenna pattern with the two antennas.

Each of the two antennas 210 and 220 may be, for instance, a rod-shaped antenna, a flat pattern antenna, a rod-tipped helical antenna, or a chip antenna (an antenna which is applied as a chip component on a substrate), but here the antenna 210 is a rod antenna and the antenna 220 is a chip antenna.

The DSP 260 shown framed by a broken line operates according to a program in reality, but in the drawing the operations are shown divided into function blocks. The DSP 260 corresponds to multiplying devices 214, 224, 215, and 225, an adding device 230, a demodulation circuit 231, re-modulation circuit 232, a memory 233, a switch 234, a counter 235, a weight calculation unit 236, a memory 237, a weight control unit 238, a UW information storage unit 239, and a modulation circuit 240.

The multiplying devices 214 and 224 weight reception signals received from reception circuits 212 and 222 respectively by multiplying them with weight vectors W1 and W2 from the weight calculation unit 236.

The multiplication devices 215 and 225 weight transmission signals received from the modulation circuit 240 by multiplying them with weight vectors W1 and W2 from the control unit 238.

The addition device 230 adds the reception signals that have been weighted by the multiplying devices 214 and 224.

The demodulation circuit 231 demodulates the reception signals after adding by the addition device 230. The result is output as a reception bit series.

The re-modulation circuit 232 re-modulates the reception bit series input from the demodulation circuit 231 to symbol data (symbol waveform data).

The UW information storage unit 239 stores the unique word information which differs for each mobile station and which is notified from the radio base station through the control channel.

The memory 233 retains a reference signal table. The reference signal table stores a signal specified as a synchronization bit pattern by the PHS Standard. In other words, the memory 233 retains symbol data (symbol waveform data) which is obtained by modulating a start symbol (SS), a preamble (PR), and the unique word (UW). The start symbol (SS) and the preamble (PR) are also prescribed by the PHS Standard.

In ordinary reception the counter 235 counts the number of symbols (0 to 120 in PHS) in synchronization with the symbol timing, from the start to the end of a reception time slot. This count value is used to distinguish between a symbol period of a bit pattern for synchronization which includes the unique word, and other periods. In ordinary reception a period from the third symbol to the sixteenth symbol is the synchronization bit pattern period which is made up of the SS, the PR, and the UW.

In ordinary reception the switch 234 selects symbol data (symbol waveform data) which represents the reference signal read from the memory 233, at times when the counter 235 shows that the count value is a synchronization bit pattern symbol period, and selects symbol data from the re-modulation 232 circuit during other periods.

The weight calculation unit 236 calculates a weight vector each symbol. This weight vector is calculated so that the difference between the result of weighting then adding together the reception signals input from the input circuit 222 and the symbol data input from the switch 234 is a minimum. The calculation of the weight vector is the same as in the weight calculation unit 58 explained earlier.

The memory 237 stores the weight vectors calculated by the weight calculation unit 236. Here the weight vectors calculated for the end symbol of the reception time slot are suitable. These weight vectors are used in the transmission time slot which directly succeeds the reception time slot. The weight vectors of the radio units A and B are made to be W1 and W2 respectively.

The weight control unit 238 reads the weight vectors W1 and W2 from the memory 237 in the transmission time slot and outputs the weight vectors to the multiplying devices 215 and 216 respectively.

The modulation circuit 240 generates a transmission signal (symbol data) by modulating each bit series to be transmitted.

As explained, in transmission and reception on the communication channel in the mobile station 200 with the above described structure, reception is performed by forming an array antenna pattern using the weight vector calculated in the reception timeslot, and the weight vector is stored in the memory 237. In the directly succeeding transmission timeslot transmission is performed with the stored weight vector used to form the antenna array pattern.

<Operation>

The following is an explanation of the operations of the mobile station 200 which has the above-described structure.

Figure 8:
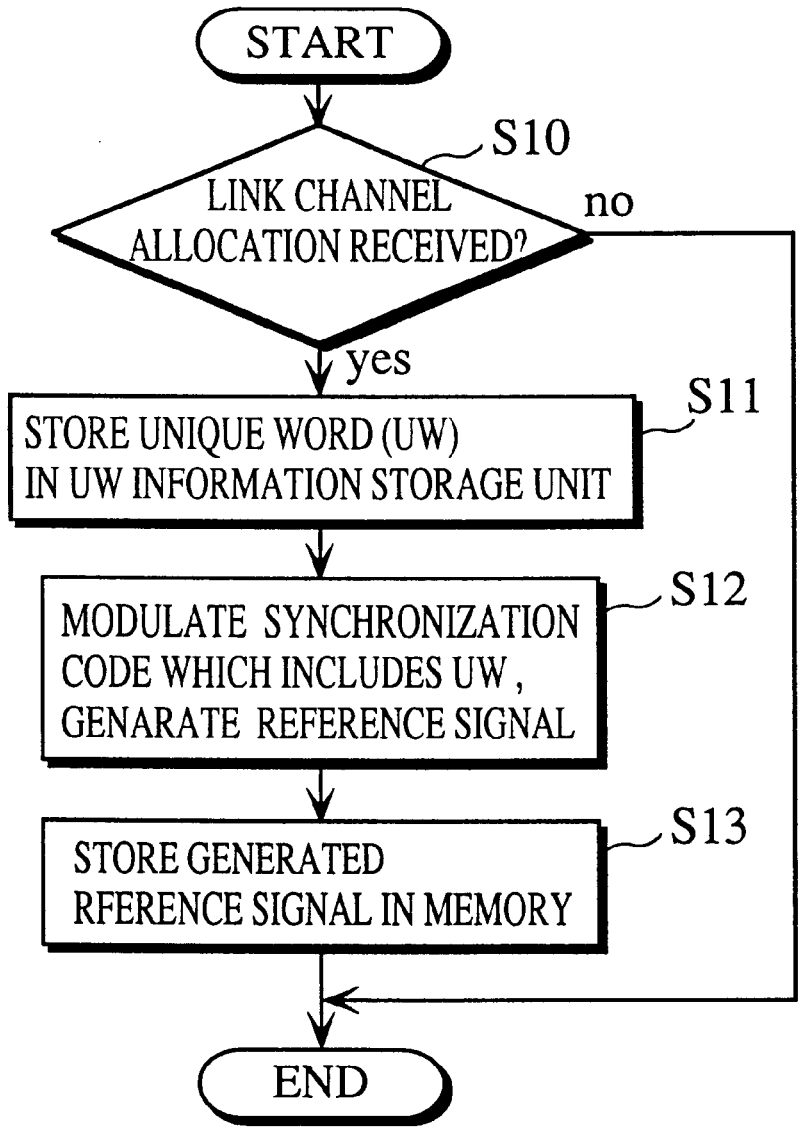
FIG. 8 is a flowchart of the operation of the mobile station 200 when receiving a link channel allocation from the radio base station in response to a link channel establishment request.

FIG. 8 is a flowchart of the operations of the mobile station 200 when it receives link channel allocation from a radio base station, in response to a link channel establishment request from the mobile station 200 to the radio base station. This link channel establishment request and link channel allocation are performed through the control channel before communication on the link channel.

The mobile station 200 receives a link channel allocation from the radio base station (step S10), and stores the unique word information included in the link channel allocation in the UW information storage unit 239 (step S11). The unique word information here is a code (bit series) allocated by the radio base station and which is different for each mobile station. The mobile station 200 generates a reference signal by modulating a standard symbol (SS) and a preamble (PR) which are prescribed by the PHS Standard, and the stored unique word (UW), using the re-modulation circuit 232 for example (step S12), and stores the generated reference signal in the memory 233 (step S13).

Note that these operations are actually realized by the DSP 260 executing a program.

After performing this process for obtaining the unique word and generating the reference signal, the mobile station 200 uses the obtained unique word in communication on the link channel as the unique word in the PHS Standard, and performs reception and transmission with the radio base station by forming directivity using the generated reference signal.

In this way the mobile station 200 is able to avoid synchronizing with signals aimed at other portable stations by mistake and form array antenna patterns accurately, because it obtains a unique word which is different for each mobile station through the control channel from the radio base station before reception and transmission on the communication channel, and calculates the weight vector using the reference signal which includes the particular unique word. According to this directivity control, interference signals radiated into other wireless zones are reduced, the allocation gap between the same frequency is shortened, and frequency usage is made more effective.

Figure 9:
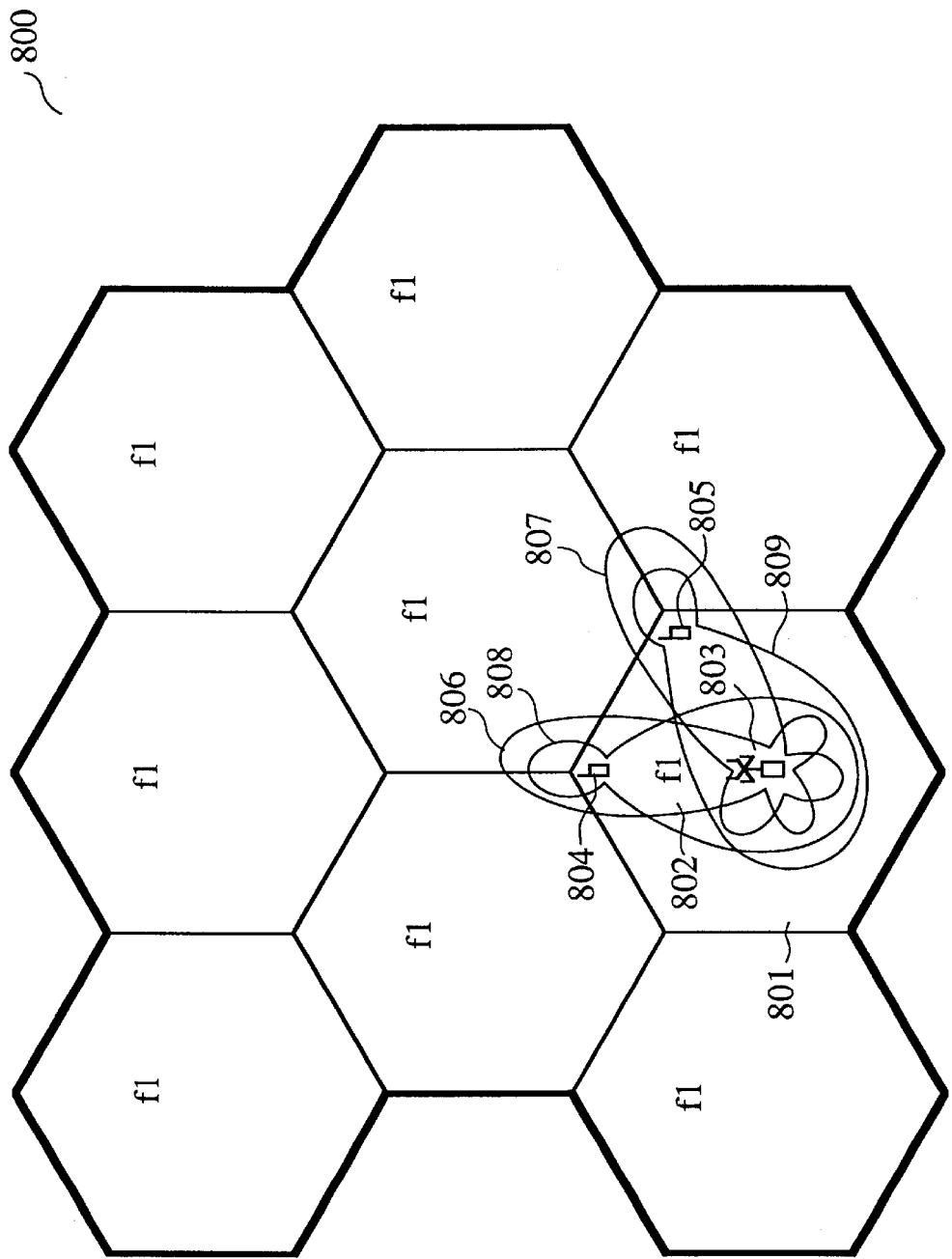
FIG. 9 is a schematic drawing for explaining path division multiple access and a wireless zone system when the radio base station and the mobile station both perform directional control.
Figure 10:
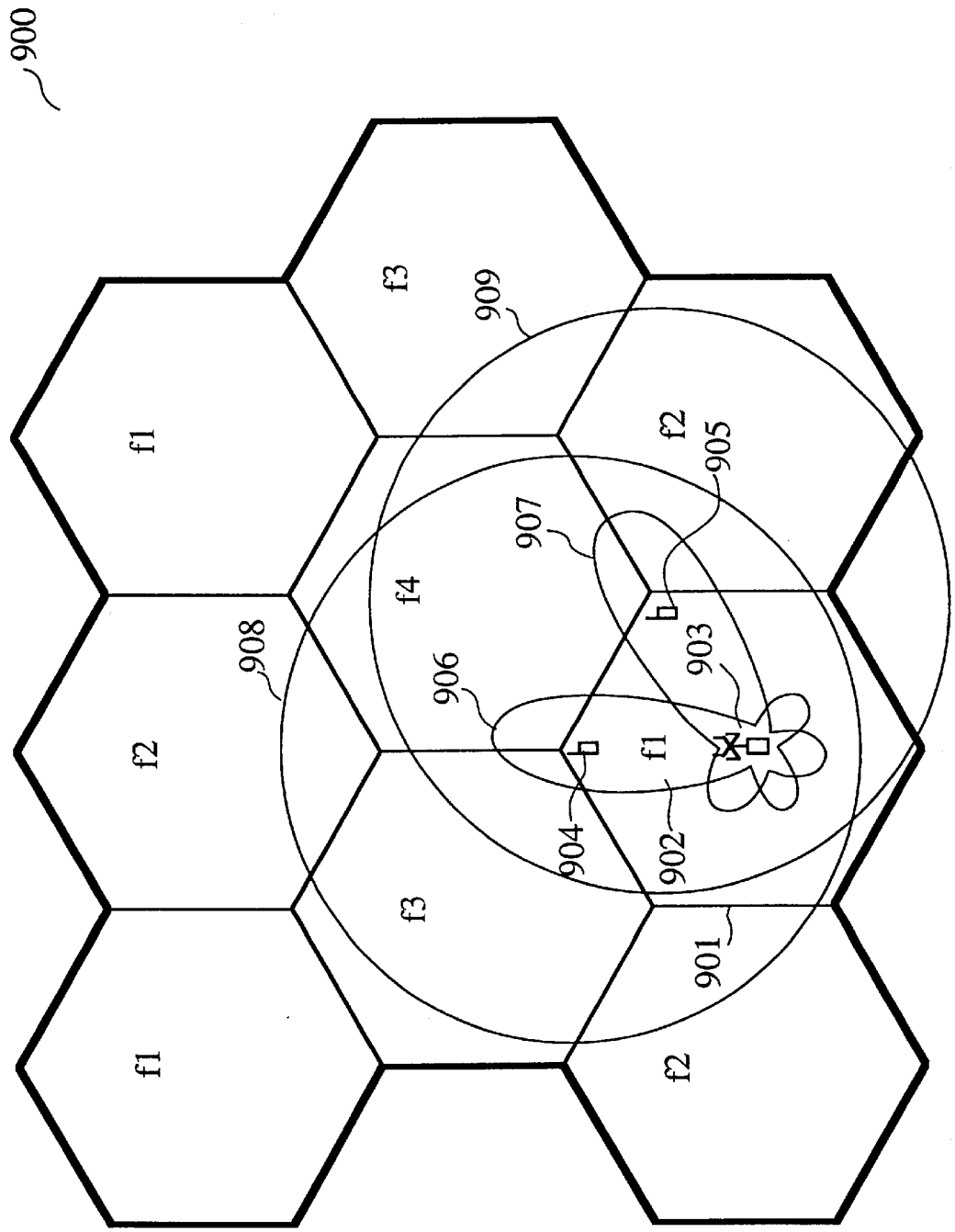
FIG. 10 is a schematic drawing for explaining path division multiple access and the wireless zone system when the radio base station performs directional control and the mobile station does not perform directional control.
Figure 11:
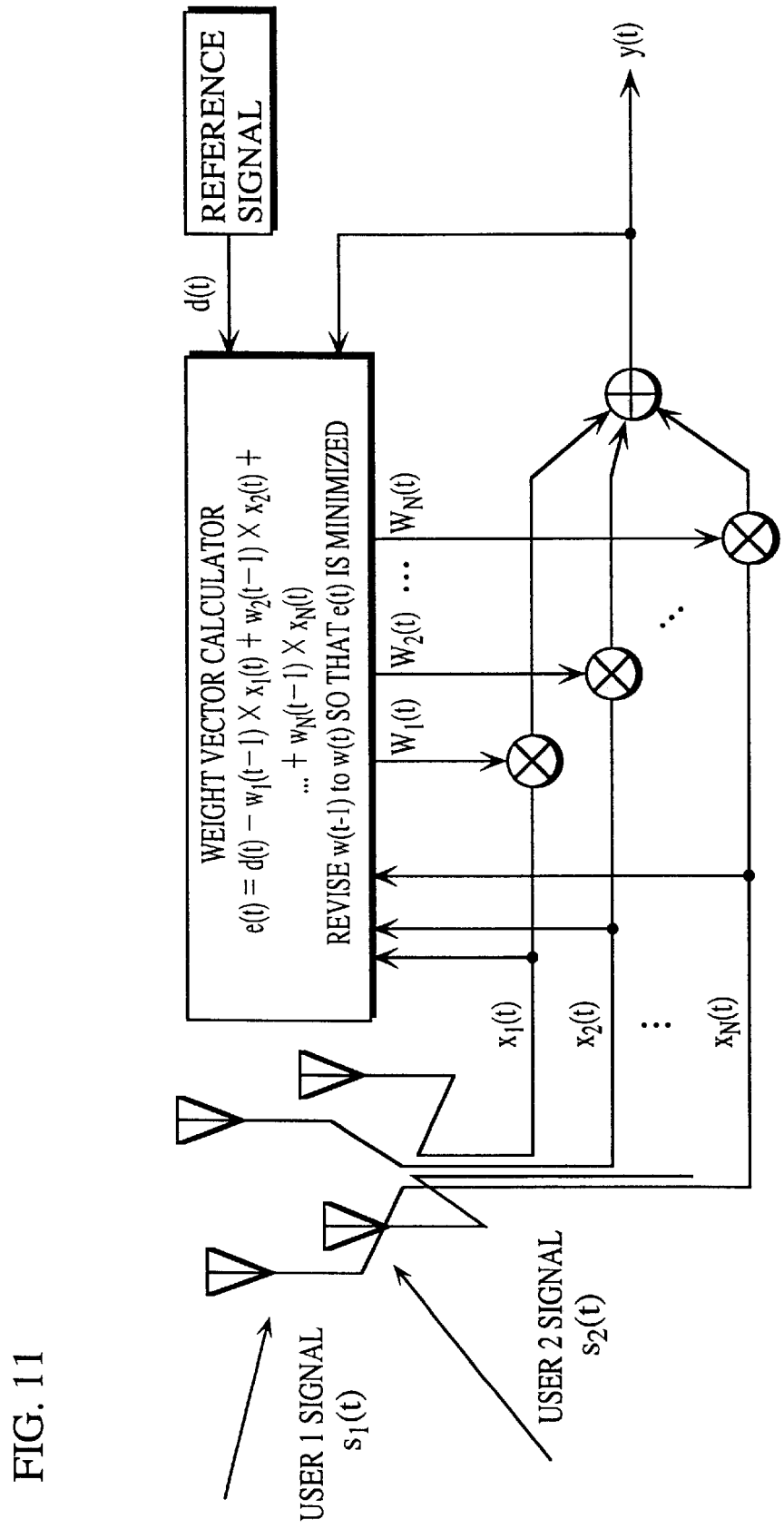
FIG. 11 is an outline showing control content by MMSE, when receiving a signal from the mobile station according to an adaptive array apparatus.

FIG. 9 shows a schematic drawing of path division multiple access and wireless zones when the radio base station and the mobile station both perform directivity control. The figure indicates that in ideal conditions where each wireless zone is a regular hexagonal shape, interference signals radiated into other zones and reception of interference signal from other zones vanish almost entirely, and that the same frequency f1 can be used repeatedly, even in adjacent zones.

<Modifications>

The above explains the radio base station and the mobile station of the present invention based on one embodiment, but the present invention is not limited to the stated embodiment. Specifically:

(1) The present invention may be a method including the steps explained in the embodiment. Furthermore, this method may be a computer program for realizing using a computer system, or a digital signal representing the program.

Furthermore, the present invention may be the program or the digital signal recorded on a computer readable recording medium such as a flexible disk, a hard disk, a CD-ROM, an MO, a DVD, a DVDROM, a DVD-RAM, or a semiconductor memory.

Furthermore, the present invention may be the computer program or the digital signal transmitted via a network for instance, of which an electric communication line, a wireless or wired communication line, and the Internet are representative.

Furthermore, the present invention may be the stated method realized by a computer system which has a microprocessor and a memory, which stores the program in the memory, and in which the microprocessor operates according to the program stored in the memory.

Furthermore, the program or the digital signal may be conveyed via the network for instance or by being recorded on a recording medium, and executed in an independent computer system.

(2) In the stated embodiment an example of a radio base station and a mobile station in a PHS system were used, but the present invention can be applied to any communication system which uses path division multiple access and transmits and receives communication data in a form which includes a synchronization code that is equivalent to a unique word which is prescribed by the PHS Standard as a component in physical slots. Furthermore, the unique word may be any bit series used as an identifier.

(3) In the stated embodiment the radio base station notifies the mobile station of the value of the unique word, however the information is not limited to the value of the unique word, but may be any identifying information that is suitable to specify the unique word such as a number 1, 2, 3, or 4. However, it is necessary to make both the radio base station and the mobile station able to specify the value of the unique word by, for instance, calculating based on the identifying information. For example, unused bits in the link channel allocation message specified in the PHS Standard used in the notification of link channel allocation may be used to notify unique word value identifying information.

(4) In the stated embodiment the unique word information stored in the unique word storage unit 90 is made to include four different pre-fixed unique word values, and the control unit 80 gives each of the values included in the unique word information to the reference signal generation unit 55 of one of the user processing units 51*a* to 51*d*. However, instead of retaining the pre-fixed unique words, the control unit 80 may be made to generate four different unique words by for instance generating random numbers, and including the random numbers in the unique word information.

(5) Although not specifically shown in the stated embodiment, after communication in path division multiple access has ended with a mobile station, the radio base station may update the unique word information to show that there is no correspondence between the particular unique word in the unique word information with a mobile station.

The present invention has been fully described by way of examples with reference to the accompanying drawings, it is to be notes that various changes and modifications will be apparent to those skilled in the art. Therefore, unless such changes and modifications depart form the scope of the present invention, they should be considered to be construed as being included therein.

What is claimed is:

1. A radio information terminal which communicates with a radio base station, comprising:

obtaining means for obtaining a code for synchronization with symbols, the symbols being part of a signal transmitted from the radio base station, and the code being notified from the radio base station;

storage means for storing the obtained code;

calculation means for calculating, based on the stored code, the data for controlling antenna directivity for each symbol; and reception means for forming, using the calculated data, an antenna directivity in which reception gain of the signal increases, and receiving the signal using the formed directivity.

2. The radio information terminal of claim 1 wherein the code shows one of (a) a preamble part of the signal, (b) a unique word part of the signal, and (c) the preamble part of the signal and the unique word part of the signal.

3. The radio information terminal of claim 2, further comprising:

generation means for generating, by modulating the stored code, a reference signal which is a basis for forming the antenna directivity, wherein the data for controlling the antenna directivity is expressed as a weight coefficient in relation to each antenna signal, the calculation means calculates a weight coefficient so that a difference between (a) a signal obtained by multiplying the signal received by each antenna with the weight coefficient and adding each resultant signal together, and (b) the reference signal decreases, and the reception means forms the directivity by multiplying the signal received by each antenna with the weight coefficient and adding each resultant signal together.

4. The radio information terminal of claim 3 wherein the code shows one of (a) a preamble part of the signal, (b) a unique word part of the signal, and (c) the preamble part of the signal and the unique word part of the signal.

5. The radio information terminal of claim 3, further comprising:

transmission means for forming antenna directivity so that transmission gain of a signal being transmitted towards the radio base station increases, by multiplying a transmission signal for each antenna with the weight coefficient and issuing a resultant signal.

6. The radio transmission terminal of claim 5 wherein the code shows one of (a) a preamble part of the signal, (b) a unique word part of the signal, and (c) the preamble part of the signal and, the unique word part of the signal.

7. A radio communication system, comprising:

a radio base station for allocating a different code to each radio information terminal, notifying each radio information terminal of the allocated code, incorporating the allocated code in information for the radio terminal, and transmitting the information to the radio terminal; and a radio information terminal of wherein the radio information terminal includes:

obtaining means for obtaining a code for synchronization with symbols, the symbols being part of a signal transmitted from the radio base station, and the code being notified from the radio base station;

storage means for storing the obtained code;

calculation means for calculating, based on the stored code, data for controlling antenna directivity for each symbol; and reception means for forming, using the calculated data, an antenna directivity in which reception gain of the signal increases, and receiving the signal using the formed directivity.

8. The radio communication system of claim 7 wherein the code shows one of (a) a preamble part of the signal, (b) a unique word part of the signal, and (c) the preamble part of the signal and the unique word part of the signal.

9. The radio communication system of claim 7 wherein the radio information terminal further comprises:

generation means for generating, by modulating the stored code, a reference signal which is a basis for forming the antenna directivity, the data for controlling the antenna directivity is expressed as a weight coefficient in relation to each antenna signal, the calculation means calculates a weight coefficient so that a difference between (a) a signal obtained by multiplying the signal received by each antenna with the weight coefficient and adding each resultant signal together, and (b) the reference signal decreases, and the reception means forms the directivity by multiplying the signal received by each antenna with the weight coefficient and adding each resultant signal together.

10. The radio communication system of claim 9 wherein the code shows one of (a) a preamble part of the signal, (b) a unique word part of the signal, and (c) the preamble part of the signal and the unique word part of the signal.

11. The radio communication system of claim 9, wherein the radio information terminal further comprises:
transmission means for forming antenna directivity so that transmission gain of a signal being transmitted towards the radio base station increases, by multiplying a transmission signal for each antenna with the weight coefficient and issuing a resultant signal.

12. The radio communication system of claim 11 wherein the code shows one of (a) a preamble part of the signal, (b) a unique word part of the signal, and (c) the preamble part of the signal and the unique word part of the signal.

13. A communication method used by a radio information terminal which communicates with a radio base station, comprising:
an obtaining step for obtaining a code for synchronization with symbols, the symbols being part of a signal transmitted from the radio base station, and the code being notified from the radio base station;
a storage step for storing the obtained code;
a calculation step for calculating, based on the stored code, data for controlling antenna directivity for each symbol; and
a reception step for forming, using the calculated data, an antenna directivity in which reception gain of the signal increases, and receiving the signal using the formed directivity.

14. The communication method of claim 13, further comprising:
a generation step for generating, by modulating the stored code, a reference signal which is a basis for forming the antenna directivity,
wherein the data for controlling the antenna directivity is expressed as a weight coefficient in relation to each antenna signal,
the calculation step calculates a weight coefficient so that a difference between (a) a signal obtained by multiplying the signal received by each antenna with the weight coefficient and adding each resultant signal together, and (b) the reference signal decreases, and
the reception step forms the directivity by multiplying the signal received by each antenna with the weight coefficient and adding each resultant signal together.

15. The communication method of claim 14, further comprising:
a transmission step for forming antenna directivity so that transmission gain of a signal being transmitted towards the radio base station increases, by multiplying a transmission signal for each antenna with the weight coefficient and issuing a resultant signal.

16. A computer executable program for realizing a communication method used by a radio information terminal which communicates with a radio base station, executing on a computer:
an obtaining step for obtaining a code for synchronization with symbols, the symbols being part of a signal transmitted from the radio base station, and the code being notified from the radio base station;
a storage step for storing the obtained code;
a calculation step for calculating, based on the stored code, data for controlling antenna directivity for each symbol; and
a reception step for forming, using the calculated data, an antenna directivity in which reception gain of the signal increases, and receiving the signal using the formed directivity.

17. The program of claim 16, further executing:
a generation step for generating, by modulating the stored code, a reference signal which is a basis for forming the antenna directivity,
wherein the data for controlling the antenna directivity is expressed as a weight coefficient in relation to each antenna signal,
the calculation step calculates a weight coefficient so that a difference between (a) a signal obtained by multiplying the signal received by each antenna with the weight coefficient and adding each resultant signal together, and (b) the reference signal decreases, and
the reception step forms the directivity by multiplying the signal received by each antenna with the weight coefficient and adding each resultant signal together.

18. The program of claim 17, further executing:
a transmission step for forming antenna directivity so that transmission gain of a signal being transmitted towards the radio base station increases, by multiplying a transmission signal for each antenna with the weight coefficient and issuing a resultant signal.

* * * * *